United States Patent [19]
Riley

[11] Patent Number: 5,035,961
[45] Date of Patent: Jul. 30, 1991

[54] INTERNAL CROSS-ANCHORING AND REINFORCING OF MULTI-LAYER CONDUCTIVE OXIDES

[75] Inventor: Brian Riley, Willimantic, Conn.

[73] Assignee: Combustion Engineering, Inc., Windsor, Conn.

[21] Appl. No.: 375,609

[22] Filed: Jul. 5, 1989

[51] Int. Cl.$^5$ .............................................. H01M 8/12
[52] U.S. Cl. ........................................ 429/30; 429/32; 156/89; 156/283
[58] Field of Search .............. 429/30, 32; 156/89, 156/283; 29/623.4

[56] References Cited
U.S. PATENT DOCUMENTS 4,526,635  7/1985  Heinrich et al. .................. 156/89
4,799,936  1/1989  Riley ................................. 429/30 X
4,857,420  8/1989  Maricle et al. ................... 429/32 X
4,874,678  10/1989  Reichner ........................ 429/32 X Primary Examiner—Stephen J. Kalafut
Attorney, Agent, or Firm—Chilton, Alix & Van Kirk

[57] ABSTRACT

A solid oxide fuel cell 10 including a plurality of sheet-like components including a fuel electrode, an electrolyte 28, and an air electrode 26, sandwiched between interconnector sheet members 14,16, wherein the improvement comprises one of the components having exteriorly projecting inorganic whiskers 80 interengaged with inorganic whiskers projecting from another component, the interengagement serving to mechanically anchor the one and other components together. The anchored components can be an electrode and an electrolyte, an electrode and the interconnecting support structure, or the triplex layer as a unit and the interconnecting support structure.

23 Claims, 4 Drawing Sheets

INTERNAL CROSS-ANCHORING AND REINFORCING OF MULTI-LAYER CONDUCTIVE OXIDES

BACKGROUND OF THE INVENTION

The present invention relates to a method of forming and joining conductive oxide layers and, more particularly, the method of forming and the resulting juncture of the anode, cathode, electrolyte and support members in a tubular, planar or monolithic type solid oxide fuel cell.

Fuel cells of the type pertaining to the present invention, are exemplified by the disclosures of U.S. Pat. No. 4,598,028, "High Strength Porous Support Tubes for High Temperature Solid Electrolyte Electrochemical Cells", and U.S. Pat. No. 4,799,936, "Process of Forming Conductive Oxide Layers in Solid Oxide Fuel Cells". In these and similar fuel cells, fuel is absorbed at an anode, oxidant is absorbed at a cathode, and the fuel and oxidant react in the electrolyte.

In solid oxide fuel cells (SOFC), and in particular cells of the monolithic design (MSOFC) such as described in U.S. Pat. No. 4,799,936, the electrolyte is composed of a thin layer of yttria stabilized zirconia; the anode or fuel electrode is a cermet of nickel and zirconia; the cathode or air electrode is a strontium doped lanthanum manganite; and the interconnector, or support structure, is magnesium (or strontium) doped lanthanum chromite.

In the presently favored MSOFC, the generator is made up of a series of "stacks", each stack being made of a corrugated triplex layer of fuel electrode-electrolyte-air electrode, and a planar support layer of anode-interconnected-cathode, or, the corrugated layer may be sandwiched between two interconnector support layers or sheets. Fuel and oxidants must be physically separated by the impervious interconnector and electrolyte. These materials are approximately 95 percent of theoretical density. The fuel and air electrode must be porous enough to allow, by diffusion, both fuel and air to the electrodes and are approximately 70 percent of theoretical density.

In fabricating the MSOFC, the entire modular structure of corrugated layers, planar interconnector and the modular housing and manifold are initially assembled in the "green" or unsintered state. The entire modular structure is then debound at a relatively low temperature, so that decomposition and removal of organic constituents as a gas phase is achieved. The debound modular structure is then sintered as a unit. The material integrity of the monolithic envelope and the intrinsic electronic structure of the triplex electrolyte and interconnector members are of major significance in determining the working efficiency of the module.

Internal cracking, triplex layer lift off, delamination or bubbles have been the cause of a large number of failures in the initial fabrication trials on the MSOFC stack. Autopsies of failed stacks have shown that the possible causes of failure arise from debinding or sintered mismatch upon heating, and differential thermal expansion mismatch on temperature cycling. Thus, one of the greatest inherent problems associated with the ceramic process of debinding, is the achievement of temperature homogeneity throughout the ceramic system. Any temperature differential within the same material or different rates of decomposition between dissimilar materials will cause stress related areas within the structure.

As a result of these types of stresses, separation of contact points and macro separation of interfacing surfaces at later stages in the fabrication process or during in-cell operation are likely to occur. This degraded condition adversely affects performance and is a major obstacle in the further development of SOFC, and particularly, MSOFC.

SUMMARY OF THE INVENTION

It is thus an object of the present invention to provide a solid oxide fuel cell structure, and associated fabrication method, such that the layers of electrodes, electrolytes, interconnector and support structures, are more resistant to internal cracking, layer lift off, delamination, or bubbles during fabrication and in use.

According to the present invention, this objective is achieved by the addition to the individual layers of conductive oxide or to the adjoining surfaces in the "green" or plastic state, whiskers or chopped fibers of an inorganic, stable material which will act as anchors and reinforcing filaments between layers. Similarly, by the addition of such whiskers or chopped fibers to adhesive type slurries in the process of building the stacks and manifold structures into the module, the whiskers or chopped fibers will act as anchors and reinforcers.

One apparatus embodiment of the invention is a solid oxide fuel cell including a plurality of sheet-like components including a fuel electrode, an electrolyte, and an air electrode, sandwiched between support sheet members, wherein the improvement comprises one of the components having exteriorly projecting inorganic whiskers interengaged with inorganic whiskers projecting from another component, or with the other body of the other component. The interengagement serves to mechanically anchor the one and other components together. The anchored components could be an electrode and an electrolyte, an electrode and the support structure, or the triplex layer as a unit and the support structure.

One process embodiment of the invention is a method for fabricating a solid oxide fuel cell having a plurality of sheet members joined together as a stack. The steps include forming a plastic composite material into a first layer, the first layer including a multiplicity of inorganic whiskers projecting from its surface. A second plastic composite material is formed into a second layer, the second layer also having a multiplicity of inorganic whiskers projecting from its surface. The layers are joined together to form a rigid laminar sheet, wherein a plurality of the whiskers in the first layer are physically interengaged with the whiskers of the second layer to serve as anchors between the layers. Alternatively, the whiskers can be either mixed into the ingredients before the plastic sheets are formed, or they can be sprayed onto the surfaces of the sheets at substantially any stage of fabrication prior to sintering of the stack.

Thus, the present invention reinforces the interface between sheets or layers in SOFC, and, preferably, internally reinforces the sheets and layers as well. This reduces the tendency for thermal ratcheting in operation where a differential in thermal expansion between the layers of conductive oxides is likely to occur, and which would otherwise produce destructive delamination, debonding, convolute cracking, and electronic short failure. Preferably, the whiskers or fibers are distributed substantially uniformly throughout and occupy between about 5 and 10 volume percent of each layer.

BRIEF DESCRIPTION OF THE DRAWINGS

These and other objects and advantages of the invention will be described below with reference to the accompanying drawings, wherein like numerals on different figures represent corresponding structures, and in which.

DESCRIPTION OF THE PREFERRED EMBODIMENT

Figure 1B:
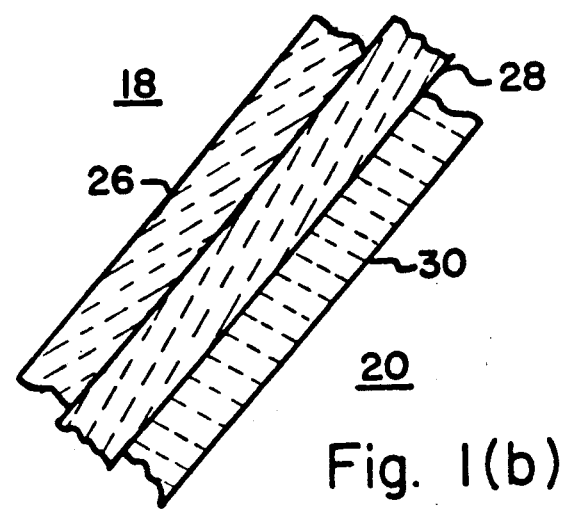
FIGS. 1(a)-(c) are schematic illustrations of a cross section of a monolithic solid oxide fuel cell, including detailed enlargements of the electrode/electrolyte interface and the planar support members.
Figure 1A:
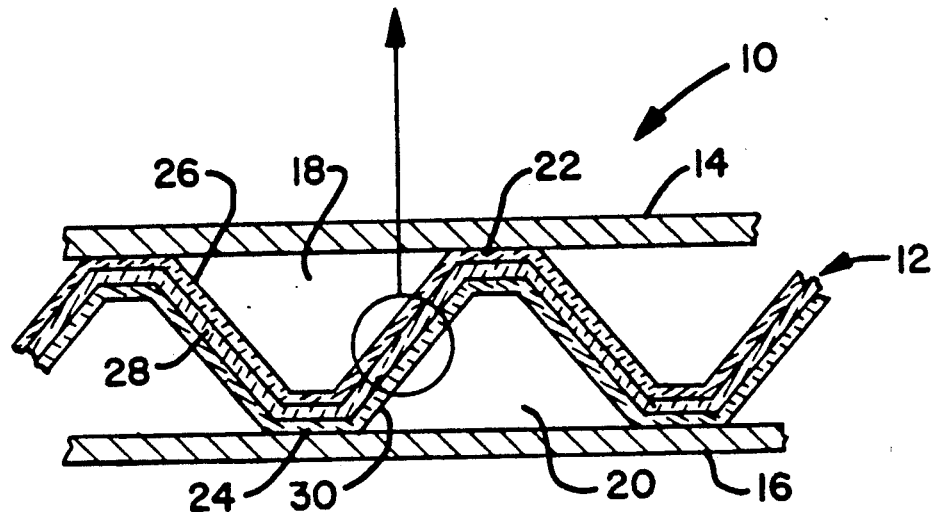
Figure 1C:
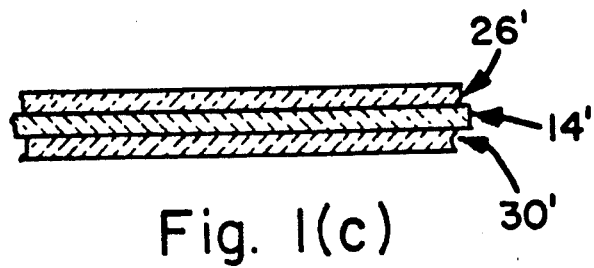

FIG. 1 is a schematic view, a portion of which is enlarged, showing a cross section of a monolithic solid oxide fuel cell 10. The most notable feature of the cell 10 is a corrugated sheet 12, often referred to as the triplex layer, which is sealingly supported between spaced apart interconnector members 14,16. This defines alternating pockets 18,20 of air and fuel, such that the electronic reaction can proceed between pockets, through the triplex layer 12, in a manner well known in this field of technology. For proper operation of the fuel cell 10, the electrical contact surfaces 22, 24 between the triplex layer and the interconnector members must remain intact, the layers 26,28,30 forming the triplex sheet must remain intimately bonded, and the triplex layer 12 must not be breached between pockets 18,20. In practice, interconnect support members 14,16 can each be in the form of a triplex support member having anode 26', interconnect 14', and cathode 30' layers sandwiched together.

Figure 2:
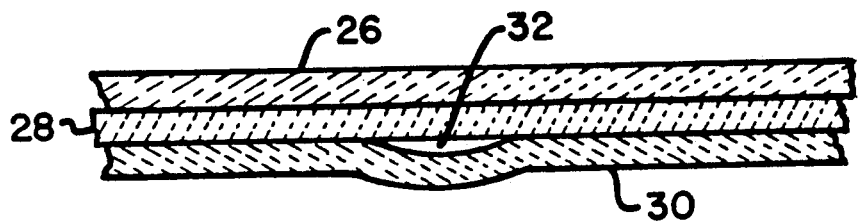
FIG. 2 is a schematic illustration of an example of an internal failure within the triplex layer of an MSOFC module after debinding and sintering.
Figure 3:
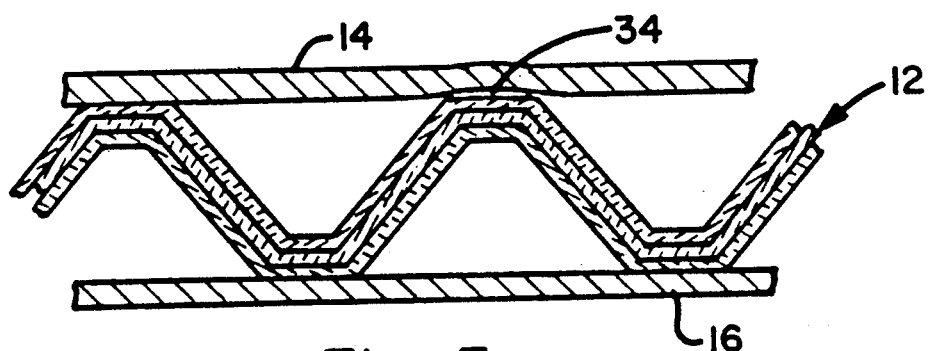
FIG. 3 is a schematic illustration of an MSOFC failure due to separation of the triplex layer from the interconnector.
Figure 4:
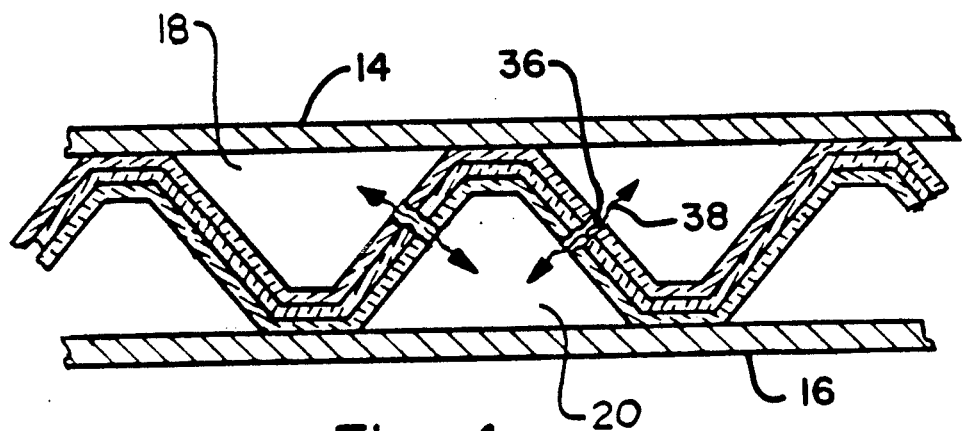
FIG. 4 is a schematic illustration of another example of an MSOFC failure due to cracking of the triplex layer.

FIG. 2 shows an example of layer lift off 32 within the triplex sheet or layer. FIG. 3 illustrates an example of triplex layer separation 34 from the interconnector member 14, and FIG. 4 illustrates an example of cracking 36 of the triplex layer with a resultant cross leakage path 38 for reactant gases to pass from the air to the fuel pockets 18,20 or vice versa.

It should be appreciated that the schematic illustration of the MSOFC cell and associated defects shown in FIGS. 1-4 are representative, and that the use herein of the term "layer" or "sheet" is to be broadly construed as encompassing other shapes or configurations of solid oxide fuel cell components e.g., planar and tubular.

As used herein, the terms "strips", "sheet" and "layer" may be deemed synonymous. A "sheet" may consist of a uniform material, or, such as an interconnector 14, 16 or a laminated structure, as the triplex layer 12. A "component" may simultaneously be a sheet or a layer. For example, in FIG. 1, the corrugated triplex component 12 may be deemed a layer when sandwiched between the upper and lower interconnector layers 14, 16, to form a "sheet" in the form of a single fuel cell 10, whereas in the detailed view, the triplex component 12 may be viewed as a sheet having three laminated layers, i.e., the air electrode 26, the electrolyte 28, and the fuel electrode 30.

Figure 5:
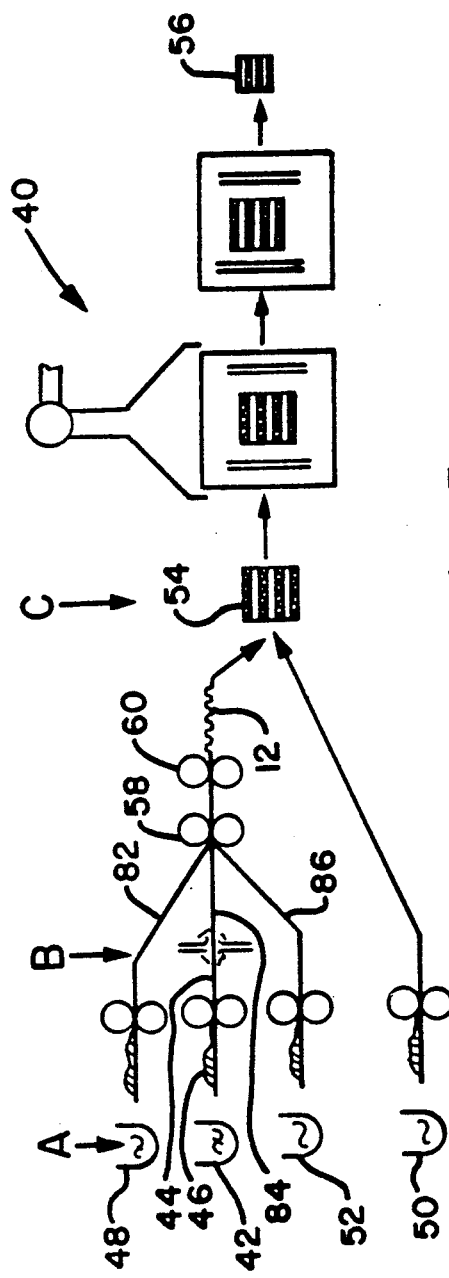
FIG. 5 is a schematic illustration of the fabrication of an MSOFC by strip calender rolling with the addition of inorganic reinforcing fibers in accordance with the present invention.
Figure 7:
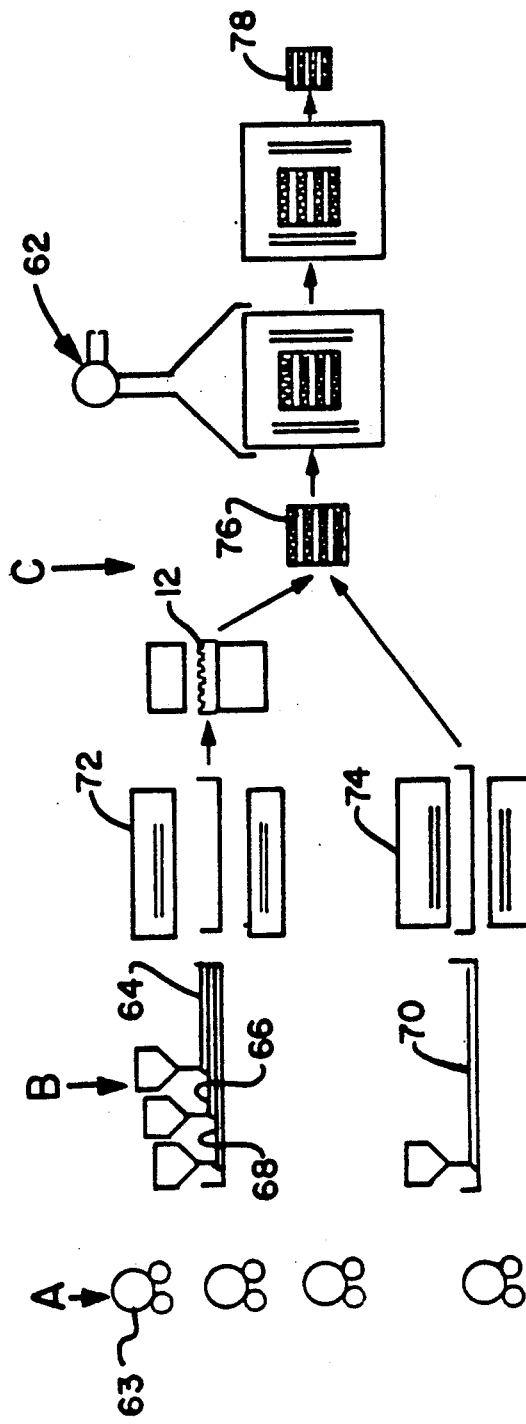
FIG. 7 is a schematic illustration of the slip casting process for fabricating an MSOFC, including the addition of reinforcing whiskers in accordance with the invention.

MSOFC structures can be fabricated by at least two processes, such as shown in FIGS. 5 and 7. FIG. 5 shows the strip calender rolling system 40 wherein yttria stabilized zirconia electrolyte powder, of ceramic grade when mixed with organic binders, plasticizers and dispersants in an impeller type blender 42, will form a plastic composite material 46 which is capable of being hot rolled into thin sheets 44. This sheet has a high solids loading, of approximately 90 percent, and a high density, less than one volume percent porosity. This sheet-like material when heated to a high temperature has a sufficient solids content to form a sintered impervious mass with a density of 95 percent of theoretical. In like manner, organic binder, plasticizer, dispersant and enough added solvent can form a slip, or thick slurry. This slurry 46 can be cast or spread into thin sheets by the use of a doctor blade spreader. After solvent evaporation and/or plastic polymer curing, the pliable film may be stripped from the underlay former for further processing.

In a similar manner, strontium doped lanthanum manganite air electrode powder 48, magnesium doped lanthanum chromite interconnector powder 50, and a cermet mixture of nickel oxide and zirconium oxide powders 52 for the fuel electrode may be fabricated into sheet-like materials.

The fabrication as depicted in FIG. 1, having the triplex layer 12 of air electrode 26, electrolyte 28 and fuel electrode 30 is achieved by co-rolling the three sheets under heated pressure rollers 58,60 as shown in FIG. 5 to produce the corrugated layer 12. The interconnector layers 16 are added to form the "green" or unsintered MSOFC module 54. The assembled stack is then debonded and sintered to produce the sintered module 56.

FIG. 7 shows the alternative, slip casting fabrication system 62 wherein each component is formed by slip casting after ball milling the powders such as at 63, whereby multiple layers 64,66,68 may be laid down on top of each other at the same time to form the triplex layer. The triplex layer and the interconnector layers 70 are respectively cured at 72,74. The components are then assembled into a stack 76, with an adhesive slurry The subsequent steps of debinding and sintering to form the sintered module 78 are substantially the same as described with respect to the strip rolling process of FIG. 5.

The foregoing processes as described are conventional, and in accordance with the invention, are modified as follows.

At least three techniques are available for incorporating the whiskers or chopped fibers 80 (hereinafter referred to as "fibers"), into the MSOFC structure prior to sintering. With respect to the hot rolling process of FIGS. 5 and 6, the fibers 80 may be added to the slurry or slip blends of the conductive oxides at stages A. Alternatively, the fibers may be added to the individual sheet surfaces at stage B, or the fibers may be deposited on the adhesive slurry in building up to the module stacks and housing at stage C.

Figure 6:
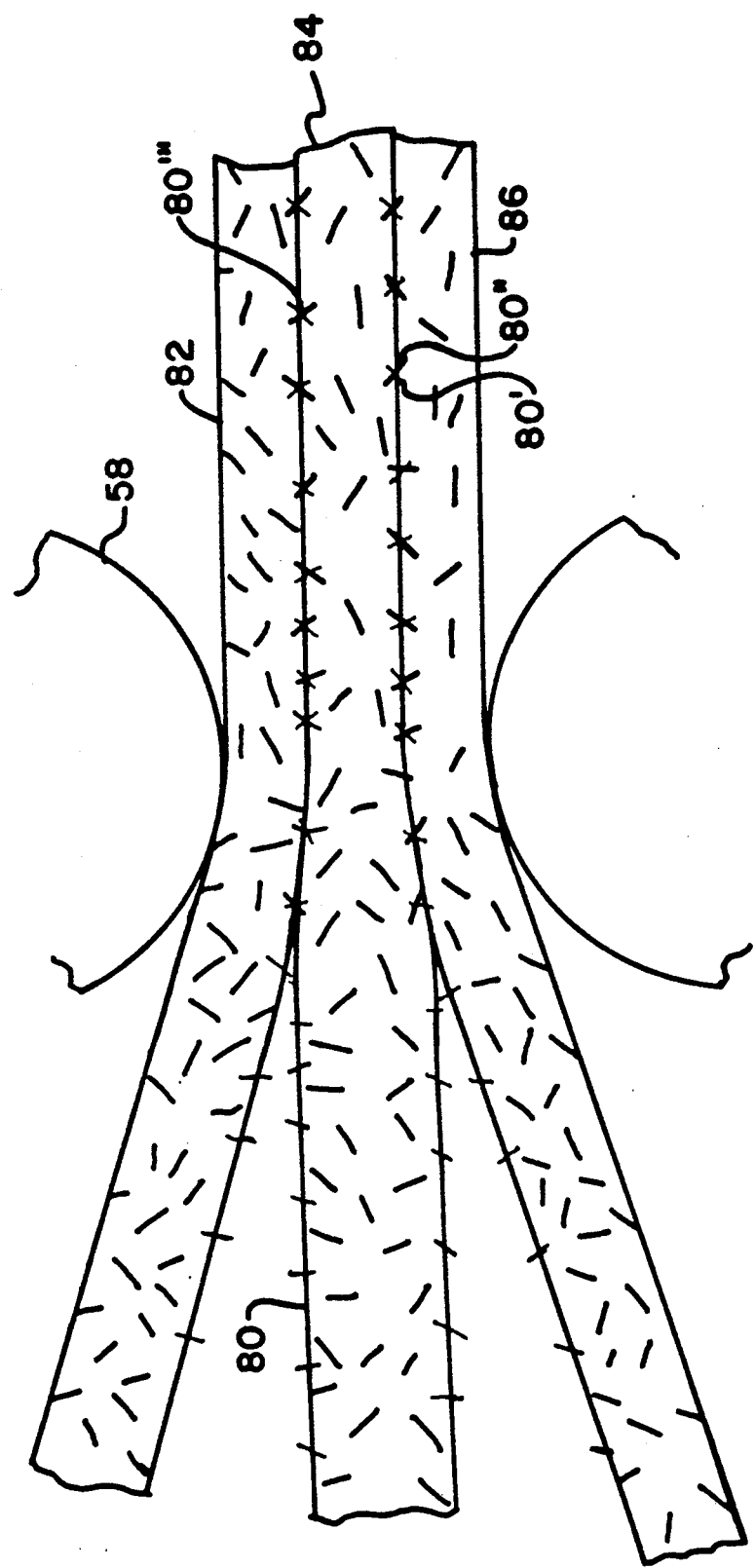
FIG. 6 is a schematic detailed illustration of the joining of the triplex layers in the calender rolling process, with the resulting interengagement of the reinforcing fibers in accordance with the invention.

FIG. 6 is an enlarged, schematic view of the joining of the electrode and the electrolyte layers 82,84,86 to form a triplex sheet with the hot roller process of FIG. 5. It may be seen that the fibers 80 are dispersed substantially uniformly throughout each component layer prior to their passage between the hot rollers 58, and that after the triplex sheet has emerged from the rollers, project from one component layer into the adjacent component layer, and more particularly, the whiskers 80' projecting from the surface of one layer become mechanically interengaged with the fibers 80" projecting from the other layer. A secondary anchoring is provided by the projection of fibers 80''' across the boundary between layers even if no interengagement is achieved with other fibers. As a result, the fibers internally reinforce each layer, and other fibers serve to physically anchor one layer to the adjacent layer.

With the embodiment associated with the spraying or other application of the fibers 80 onto the surfaces of the layers, such as at stages B or C in FIGS. 5 and 7, the fibers are preferentially distributed towards the surfaces, and, accordingly, serve the primary function of anchoring adjacent surfaces while providing some degree of reinforcement of each layer near its surface.

Those skilled in the field of solid oxide fuel cell technology will appreciate that the present invention can be implemented for external anchoring and internal reinforcing purposes in both monolithic, tubular, disk, plate, and molten carbonate designs, and, potentially, in the construction of the gas manifolds and housings. The composition and size of the fibers can be varied according to particular needs and chemical compatibility, but in general, for MSOFC stacks of the type shown in FIGS. 5 and 7, the fibers 80 should have lengths in the range of about 100–400 microns, for oxide layers having a thickness in the range of about 500–100 microns. The fibers are generally made from a refractory inorganic material, with SiC, $Si_3N_4$, $SiO_2$ or similar silicon compounds being preferred. The co-rolling and co-casting of the individual oxide layers including fibers causes the surface fibers to transfer across the surface boundary to act as anchor rods. On curing or drying, a partial shrinkage locks the fibers in position. The fibers are selected to be chemically inert and, if they occupy a volume fraction in the range of about 2–15 percent, preferably 5–10 percent, they will provide sufficient anchoring and reinforcing, yet not degrade the electrochemical performance within the fuel cell.

I claim:

1. In a solid oxide fuel cell including a triplex sheet having laminar layers of fuel electrode, electrolyte, and air electrode, the sheet being sandwiched between support layers, the improvement comprising:
at least two of said layers having inorganic whiskers projecting from the surface of one layer and interengaged with the other layer, said interengagement serving to anchor said two layers together.

2. The improved fuel cell of claim 1, wherein the whiskers are made from a silicon compound.

3. The improved fuel cell of claim 1, wherein the whiskers have a length in the range of about 100–400 microns and the layers are about 500–1000 microns thick.

4. The improved fuel cell of claim 1, wherein the whiskers are substantially uniformly distributed in the layers.

5. The improved fuel cell of claim 4, wherein the whiskers occupy between about five and ten volume percent of the layer.

6. The improved fuel cell of claim 1, wherein each of the fuel electrode and air electrode have projecting whiskers interengaged with projecting whiskers on a common electrolyte.

7. The improved fuel cell of claim 1, wherein each support layer is in the form of a sheet having a surface containing a multiplicity of projecting inorganic whiskers, and wherein the electrode layers of the stack have projecting inorganic whiskers interengaging the whiskers on the support layer.

8. The improved fuel cell of claim 1, wherein the whiskers are made from a refractory inorganic material.

9. The improved fuel cell of claim 1, wherein the whiskers are distributed substantially only on the exterior surface of the layers.

10. In a solid oxide fuel cell including a plurality of sheet like components including a fuel electrode, an electrolyte, and an air electrode, disposed between support member components, the improvement comprising:
one of said components having exteriorly projecting inorganic whiskers interengaged with another component, said interengagement serving to mechanically anchor the one and other components together.

11. The improved fuel cell of claim 10, wherein said one component is an electrode and said other component is a support member.

12. The improved fuel cell of claim 10, wherein said one component is an electrode and the other component is the electrolyte.

13. The improved fuel cell of claim 10, wherein the fuel and air electrodes are laminated in contact with a common electrolyte therebetween, to form a triplex sheet, and wherein said one component is the triplex sheet and the other component is a support member.

14. The improved fuel cell of claim 13, wherein each of the electrodes and electrolyte have exteriorly projecting inorganic whiskers which interengage on the contact surfaces of the laminar sheet.

15. The improved fuel cell of claim 10, wherein the other component has exteriorly projecting whiskers and the projecting whiskers from the one and other component are interengaged.

16. A process for fabricating laminar sheets for a solid oxide fuel cell having a plurality of sheet members joined together as a stack, comprising the steps of:
forming a first plastic composite material into a first layer, the first layer including a multiplicity of inorganic whiskers projecting from the surface of the first layer;
forming a second plastic composite material into a second layer, the second layer having a multiplicity of inorganic whiskers projecting from the surface of the second layer; and
joining and curing the layers together to form a rigid laminar sheet, wherein a plurality of the whiskers of the first layer are physically interengaged with whiskers of the second layer to serve as anchors between the layers.

17. The process of claim 16, wherein the step of forming each plastic layer includes mixing ingredients in a blender and the inclusion of said whiskers includes the step of depositing and mixing the whiskers in the blender with said ingredients.

18. The process of claim 16, wherein the step of forming each plastic layer includes the step of strip calender rolling and the inclusion of said whiskers includes the step of depositing the whiskers on the surface of the layer immediately after the step of strip calender rolling the layer.

19. The process of claim 16, wherein the step of forming each plastic layer includes the step of slip casting one layer onto another layer, and the inclusion of said whiskers includes the step of adding the whiskers to the composite materials before the respective layers are cast onto one another.

20. A process for fabricating a solid oxide fuel cell having plurality of sheet members joined together as a stack, comprising the steps of, forming a plurality of individual sheets, depositing an adhesive slurry on at least one of the sheets;

distributing a multiplicity of inorganic fibers in the slurry;

positioning said one sheet into contact with another sheet such that the slurry is in mutual contact with the sheets;

curing the slurry to adhesively bond the sheets together such that the adhesive bond is augmented by the interengagement of fibers which have one end joined to one of the sheets and the other end interengaged with a different fiber which is joined to the other sheet.

21. The process of claim 20, wherein the step of depositing an adhesive slurry is preceded by the step of distributing a multiplicity of inorganic fibers in said one and said another said sheets.

22. The process of claims 21, wherein the step of distributing fibers in the sheets includes distributing some fibers so that one portion is imbedded in the sheet and another portion projects from the sheet.

23. The process of claim 22 wherein the step of curing includes interengaging the projecting portions of the fibers between sheets.

* * * * *